US007477236B2

(12) United States Patent
Ofek et al.

(10) Patent No.: US 7,477,236 B2
(45) Date of Patent: Jan. 13, 2009

(54) REMOTE CONTROL OF ON-SCREEN INTERACTIONS

(75) Inventors: Eyal Ofek, Beijing (CN); Feng-Hsiung Hsu, Cupertino, CA (US)

(73) Assignee: Microsoft Corporation, Redmond, WA (US)

( * ) Notice: Subject to any disclaimer, the term of this patent is extended or adjusted under 35 U.S.C. 154(b) by 376 days.

(21) Appl. No.: 11/118,720

(22) Filed: Apr. 29, 2005

(65) Prior Publication Data

US 2006/0248462 A1 Nov. 2, 2006

(51) Int. Cl.
*G06F 3/033* (2006.01)
*G09G 5/08* (2006.01)
(52) U.S. Cl. ..................................... 345/158; 345/156
(58) Field of Classification Search .......... 345/156–163
See application file for complete search history.

(56) References Cited

U.S. PATENT DOCUMENTS

2001/0010514 A1* 8/2001 Ishino ........................ 345/158

OTHER PUBLICATIONS

Lucas, et al. ; An Iterative Image Registration Technique with an Application to Stereo Vision From: Proceedings of Imaging Understanding Workshop, pp. 121-130 (1981).

Shi, et al.; Good Features to Track, IEEE Conference on Computer Vision and Pattern Recognition (CVPR94) Seattle, Jun. 1994, 8 pgs.

Tomasik, et al.; Detection and Tracking of Point Features, Apr. 1991 CMU-CS-91-132 37 pgs.

* cited by examiner

*Primary Examiner*—Ricardo L Osorio
(74) *Attorney, Agent, or Firm*—Lee & Hayes, PLLC

(57) ABSTRACT

Systems and methods for remote control of on-screen interaction are described. In one aspect, a presentation is displayed onto a display surface. The presentation includes a selection control to interface with one or more user interface (UI) elements. The UI elements are used to control the presentation. A set of image frames are received from a remote handheld device. The image frames represent respective snapshots of the presentation. The image frames are evaluated to modify position of the selection control over the presentation.

18 Claims, 4 Drawing Sheets

REMOTE CONTROL OF ON-SCREEN INTERACTIONS

TECHNICAL FIELD

The systems and methods of this specification relate to user interfaces.

BACKGROUND

People are increasingly relying on computers, projectors, and slideshow presentation software to convey ideas. Context surrounding use of non-slideshow desktop applications is very different than that associated with a slideshow presentation. For example, uses of non-slideshow desktop applications typically involve a sole user sitting in close proximity to a desktop computer (or laptop). The sole user generally interfaces with the computer and the non-slideshow desktop application with a keyboard and a mouse. In contrast to a sole user interacting with a computer and application, a slideshow presentation typically involves a presenter using a computer, a wired or wireless mouse, and a projector to display slides on a large projection screen for viewing by an audience.

Use of a conventional mouse and keyboard, which typically need to be operated on a flat surface, to control slideshow presentation can be substantially inconvenient and restrictive. This is especially the case when a presenter wants to convey information in addition to that provided by the displayed slides, for example, using speech, facial expressions, body language, and/or the like. To maintain quick access to the mouse and keyboard, the presenter may choose to remain next to the computer during the presentation to control (e.g., change slides, page up, page down, etc.) the presentation. This virtual tether could limit the overall effectiveness of the presentation. The presenter could also decide to stand near the projection screen to allow greater audience contact and/or to allow the presenter to refer to objects displayed on the screen. In this case, the presenter would either have to walk back and forth between the projection screen and the mouse to operate the slideshow, or enlist aid of an assistant to operate the presentation according to the presenter's voice or gesture commands.

SUMMARY

Systems and methods for remote control of on-screen interaction are described. In one aspect, a presentation is displayed onto a display surface. The presentation includes a selection control to interface with one or more user interface (UI) elements. The UI elements are used to interact with, or control, the presentation. A set of image frames are received from a remote handheld device. The image frames represent respective snapshots of the presentation. The image frames are evaluated to modify position of the selection control over the presentation.

BRIEF DESCRIPTION OF THE DRAWINGS

In the Figures, the left-most digit of a component reference number identifies the particular Figure in which the component first appears.

DETAILED DESCRIPTION

An Exemplary System

Although not required, the systems and methods for remote control of on-screen interactions are described in the general context of computer-executable instructions (program modules) being executed by computing devices such as a general purpose computer and a mobile handheld device. Program modules generally include routines, programs, objects, components, data structures, etc., that perform particular tasks or implement particular abstract data types. While the systems and methods are described in the foregoing context, acts and operations described hereinafter may also be implemented in hardware.

Figure 1:
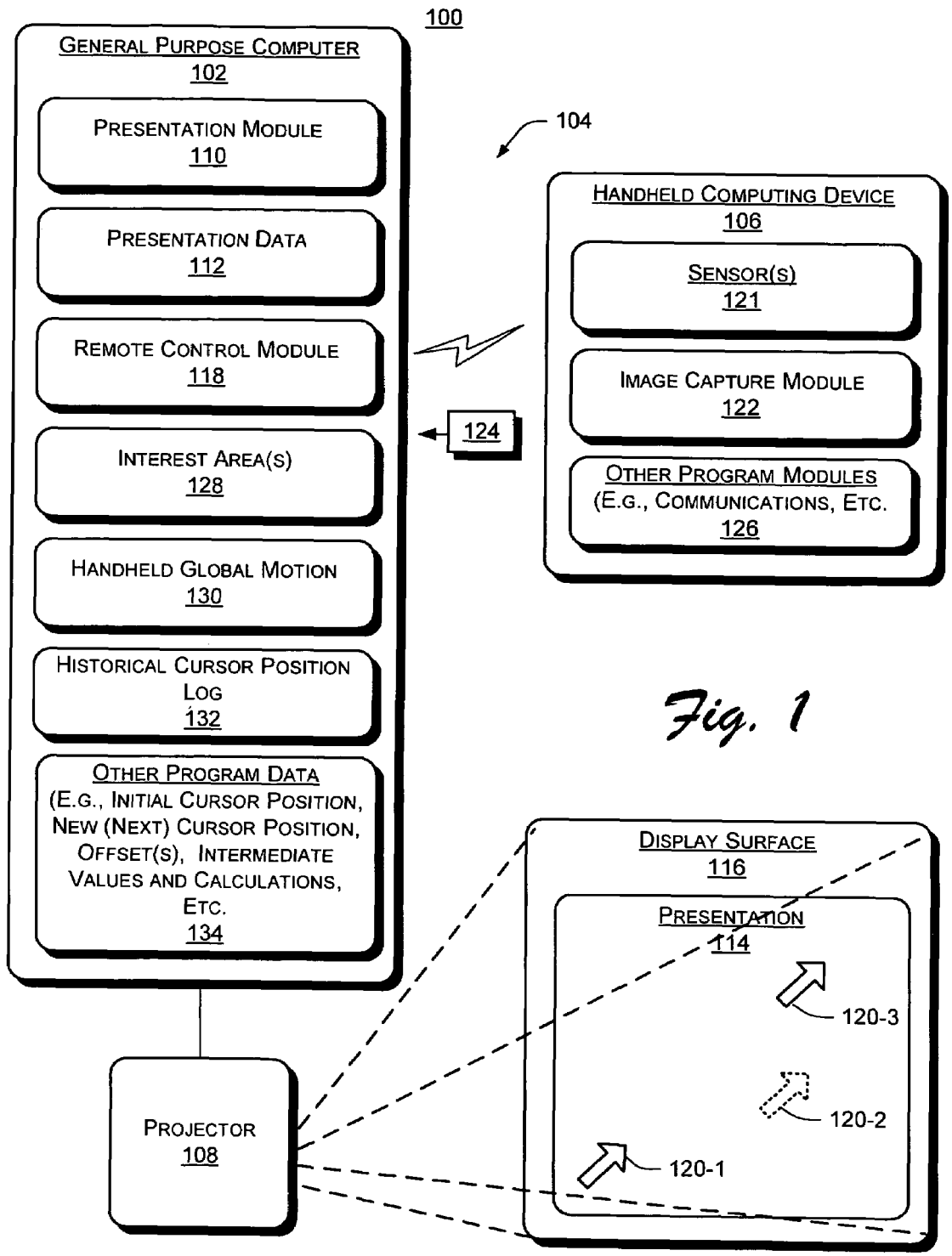
FIG. 1 illustrates an exemplary system for remote control of on-screen interactions.

FIG. 1 shows an exemplary system 100 for remote control of on-screen interactions. In this implementation, system 100 includes general purpose computing device 102 coupled over network. 104 to handheld computing device 106. General purpose computing device 102 is any type of computing device such as a personal computer, a laptop, a server, and/or so on. Network 104 may include any combination of a local area network (LAN) and a general wide area network (WAN) communication environments, such as those which are common place in offices, enterprise-wide computer networks, intranets, and the Internet. Computing device 102 is also coupled to projector 108. Such coupling can be implemented by any type of connection mechanism, for example, over network 104 or via a cable such as a VGA cable. Handheld computing device ("handheld") 106 is a small form factor mobile computing device. Small form factor mobile computing devices include, for example, a cellular phone, personal digital assistant, etc.

In this implementation, network 104 includes a wireless network, for example, a Bluetooth® or WiFi network operating as a communications path between general computing device 102 and handheld computing device 106.

General purpose computer 102 includes presentation module (a computer-program application) 110 to selectively communicate presentation data 112 to projector 108. Projector 108 projects or otherwise displays presentation data 112 as presentation 114 (e.g., a slideshow presentation, a television, DVD, VCR, Tivo®, or other presentation, interactive graphic data such as menus or a game, or other type of presentation) onto display surface 116. Display surface represents any type of display surface, for example, a TV screen, a plasma screen in a show window, an electronic billboard, a wall, etc. In this implementation, handheld 106 functions as a virtual laser pointer based on its orientation relative to display surface 116. A user interfaces with handheld 106 to control display of presentation 114 with a cursor control 120 or other user interface selection control/object presented over presentation 114. Presentation control includes, for example, show next slide, page up, page down, select menu items, and/or other presentation control operations. For purposes of exemplary illustration, cursor 120 is shown in several respective positions 120-1 through 120-3 to illustrate that a user utilizes handheld 106 to control movement of cursor 120 over presentation 114. In this example, cursor position 120-1 represents an initial position, cursor position 120-2 represents an intermediate (new) position, and cursor position 120-3 represents a new position.

Handheld 106 is equipped with a set of sensors 121. In one implementation, sensor(s) 121 represent an on-board camera or video component. Sensor(s) 121 are used to take sequential snapshots of presentation 114. These snapshots are used by system 100 to locate an initial position of cursor 120 over presentation 114, and to subsequently control movement of cursor 120 over presentation 114. More particularly, a user points sensor(s) 121 toward presentation 114 and begins taking pictures of presentation 114. In one implementation, the user begins taking pictures by pressing a button (not shown) on handheld 106, with voice activation, and/or so on. The button press, voice activation, and/or so on, activates sensors 121 and image capture module 122. Responsive to activation, image capture module 122 captures a set of image frames 124 at predetermined time intervals using sensors 121. Each image frame 124 represents, from the perspective of the location of handheld 106 to the presentation, a static image of presentation 114.

In one implementation, image frames 124 are low resolution image frames, and handheld 106 communicates image frames 124 over network 104 to remote control module 118 of general purpose computing device 102. For purposes of exemplary illustration, handheld 106 communicates image frames 124 over network 104 to remote control module 118 using a communications program module shown as a respective portion of "other program modules" 126. Handheld 106, general purpose computer 102, and projector 108 maintain a closed control loop that exists as long as image frames 124 are captured and communicated to remote control module 118. The closed control loop functions as follows. Image capture module 122 captures and communicates image frames 124 to remote control module 118. Remote control module 118 evaluates each frame 124 to determine the current (initial) location of cursor 120 over presentation 114, and to identify a set of interest areas 128 to manipulate position of cursor 120 over presentation 114.

Aspects of the control feedback loop implemented by system 100 are now described. Computing device displays a cursor 120 on display 116. Remote control module 118 identifies the cursor from a frame 124 that was captured by the handheld 106. Such identification can be done, for example, by using cues such as specific cursor color, specific cursor shape, cursor movement or animation over time (e.g., relative to static background), or a combination of such cues (e.g., a moving red arrow). For purposes of exemplary illustration, initial position for the identified cursor is shown as a respective portion of "other program data" 134.

In one implementation, if an initial position for cursor 120 in frame 124 cannot be identified, for example, because a camera encapsulated by handheld 106 captures only part of the screen, presentation module 110 is directed to present cursor 120 in one or more different positions over presentation 114, until the cursor 120 is determined to be present in a captured frame 124. In another implementation, presentation module 110 initially presents cursor 120 such that an initial cursor position can be detected from any captured frame 124 representing any portion of presentation 114. This means that all frames 124 that represent any portion of presentation 114 will capture at least a portion of cursor 120. In this latter implementation, and responsive to detection an initial position of the cursor 120, presentation module 110 shrinks the cursor to a default size that is smaller than the initially presented size.

Remote control module 118 uses the identified cursor position to calculate a new (next) cursor position. (As described below in the section titled "Conclusion", an alternate implementation of system 100 utilized handheld 106 to identify positions of the cursor 120 over presentation 114). The next cursor position is shown as a respective portion of "other program data" 136. Remote control module 118 uses any of one or more different control models to identify a next cursor position. Such control models include use of relative motion of the handheld to the presentation 114, and direct manipulation to show cursor 120 in substantially the same direction where handheld 106 is aimed. This second model does not rely on relative motion of the handheld 106 with respect to the presentation 114 or display surface 116, but determines an offset of cursor 120 from the center of a different frame 124 (i.e., a frame subsequent (e.g., subsequent and consecutive) to the one used to determine an initial cursor position). The offset is applied to an initial cursor position (i.e., last known cursor position) to specify the next cursor position. Each of these models is now described in greater detail.

The model based on relative motion implements scale and offset transformations. The model is defined by the last two known cursor positions in the frames 124. Given the two last positions of cursor 120 on the presentation 114, and in the frames 124, the rotation and scale is estimated, for example, as follows. Let $P_i=(x_i,y_i)^t(i=1,2)$ be the position of cursor 120 in frame i (124), and let $P'_i=(x'_i,y'_i)t$ be the corresponding position of the cursor in the presentation 114. The transformation is defined by four unknowns, including, rotation angle, scale and offset (both in x axis and in y). Given two points, there are four equations with four unknowns. The equations are solved for the unknowns to recover the transformation. Remote control module 118 uses the transformation to transform the center of the image represented by frame 124 (i.e., a point where the camera in handheld 106 was aimed) and map it to a position on presentation 114. This mapped position is the new cursor location. Given longer history of cursor positions, more accurate transformations can be used. The affine model uses three (3) last cursor positions (six (6) unknowns in a 2×3 linear matrix) and a projective transformation (or homography) using the last four (4) cursor positions (eight (8) unknowns).

This particular implementation operates without identifying special points in the presentation 114, or corners of display 116. As such, the described transformation is operational in a dark room, where presentation 114 and/or display 116 boundaries are not visible in the frame 124 that is being used to determine the new cursor position.

To recognize a cursor 120 by its motion or animation, remote control module 118 compensates for handheld 106 (camera) global motion, which is held by a user. To do so, handheld global motion module 130 estimates the global rotation of the handheld 106. Such rotation estimations are illustrated as a respective portion of "other program data" 134. To this end, handheld global motion module 130 matches a set of interest point features 128 and/or corners of objects visible in presentation 114. Alternatively, handheld global motion module 130 directly evaluates the transformation by minimizing differences between consecutive frames 124 to estimate the affine or projective transformation between the consecutive frames. Remote control module 118 warps a last frame 124 onto a current frame 124, and calculate the difference between them; the moving or animating cursor will be recognized as an area of large temporal difference.

In one implementation, remote control module 118 evaluates and tracks interest areas 128 across image frames 124 using one or more techniques described by: (1) Bruce D. Lucas and Takeo Kanade, "An Iterative Image Registration Technique with an Application to Stereo Vision", International Joint Conference on Artificial Intelligence, pages 674-

679, 1981; (2) Carlo Tomasi and Takeo Kanade, "Detection and Tracking of Point Features", Carnegie Mellon University Technical Report CMU-CS-91-132, April 1991; and/or (3) Jianbo Shi and Carlo Tomasi, "Good Features to Track. IEEE Conference on Computer Vision and Pattern Recognition", pages 593-600, 1994.

Remote control module 118 communicates new cursor position to presentation module 110. Responsive to receiving the new cursor position, presentation module 110 directs projector 108, via associated presentation data 112, to render cursor 120 over presentation 114 at the new position.

In view of the above, a user can control movement of cursor 120 over presentation 114 by panning handheld 106 across presentation 114 while image capture module 122 continues to take snapshots (image frames 124) of presentation 114. Such panning includes, for example, making up, down, left, right, and/or diagonal panning motions. In one implementation, for example, if the user tilts handheld device 106 forward (e.g., up), cursor 120 is moved up display surface 116. If the user tilts handheld device laterally (e.g., left or right), cursor 120 is moved in that lateral direction on display surface 116.

A user selects an object underneath a hotspot associated with cursor 120 to control presentation 114. Such an object can be any type of user interface control such as a button, scroll bar, menu, menu item, and/or so on. The particular objects used by a presentation 114 are arbitrary and a function of the particular implementation of presentation module 110.

Figure 2:
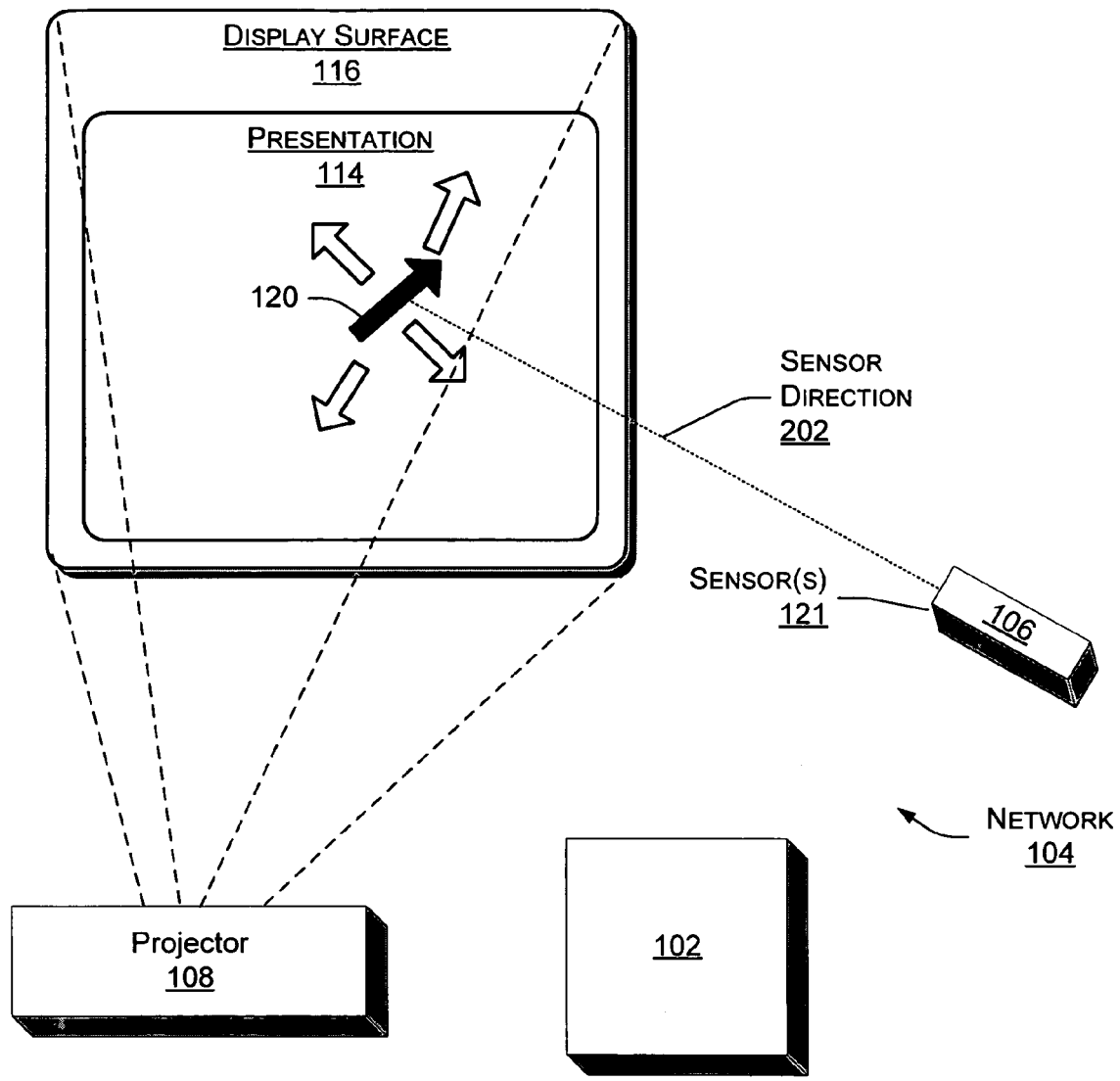
FIG. 2 shows further exemplary aspects of the system of FIG. 1 for remote control of on-screen interactions.

FIG. 2 illustrates further aspects of the exemplary system 100 of FIG. 1 for remote control of on-screen interactions. In the Figures, the left-most digit of a component reference number identifies the particular Figure in which the component first appears. FIG. 2 shows an exemplary relative orientation of handheld 106 with respect to presentation 114. Line 202 represents handheld sensor 121 direction. Light colored arrows surrounding dark colored cursor 120 represent directional arrows illustrating exemplary directions that handheld 106 can be used in conjunction with computing device 102 and projector 108 to render and control movement of cursor 120.

An Exemplary Procedure

Figure 3:
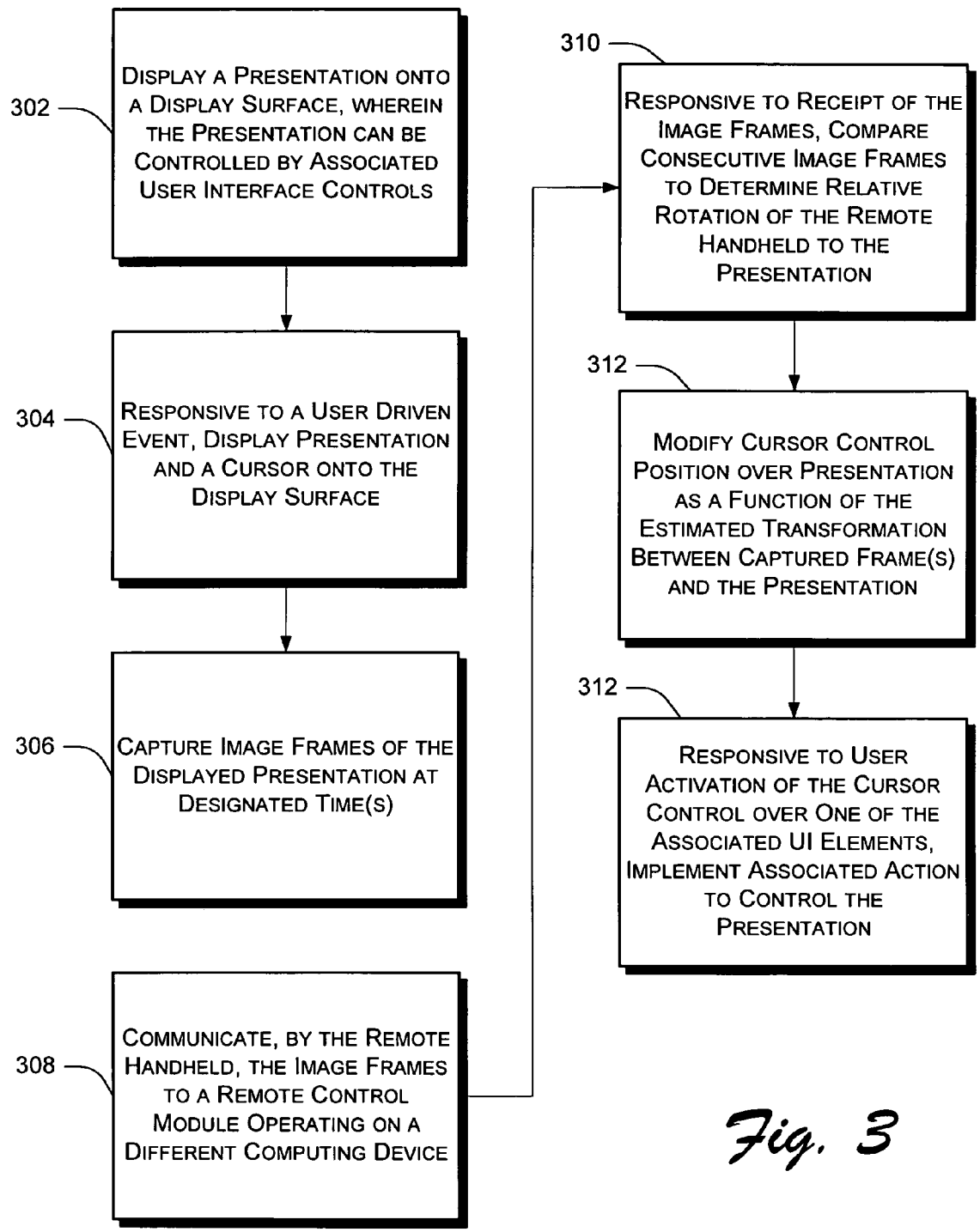
FIG. 3 shows an exemplary procedure for remote control of on-screen interactions.

FIG. 3 shows an exemplary procedure for handheld based remote control of a presentation. For purposes of discussion, the operations of FIG. 3 are described in reference to components of FIG. 1. In the Figures, the left-most digit of a component reference number identifies the particular Figure in which the component first appears. At block 302, presentation module 110 (FIG. 1) displays presentation 114 onto a display surface 116. At block 304, as a response to some user driven event, for example, a button pressed on the handheld device, presentation module 110 (FIG. 1) displays both presentation 114 and cursor 120 onto a display surface 116. Presentation 114 is now controlled by movement of cursor 120 over respective UI elements associated with presentation 114, and selection of one or more of the UI elements. The UI elements include, for example, button controls, menus, menu items, scroll bars, and/or so on. In one implementation, presentation module 100 initially renders cursor 120 at a predetermined position on the display surface 116 such as in a middle, top, bottom, left, or right portion of display surface 116.

At block 306, handheld 106 captures image frames 124 of the display presentation 114 at designated times. Each image frames 124 is a static picture or snapshot of at least a portion of presentation 114. In one implementation, handheld 106 begin capturing image frames 124 when a user activates sensors 121. Sensors 121 are operatively coupled to image capture module 122. How sensors 121 and/or image capture module 122 are activated is arbitrary. In one implementation, for example, a user begins capturing image frames 124 by pressing a button (not shown) coupled to handheld 106. If the user maintains the button press, image capture module 122 continues to capture image frames 124 at periodic time intervals, until the button press is released.

In another implementation, a first button press causes capture of image frames 124, and a second button press directs image capture module 122 to cease capturing image frames 124. In yet another implementation, for example, the user controls capture of image frames 124 via voice commands. (In this latter implementation, "other program modules" 126 include a voice recognition computer software module). In view of the above, the particular technique used by handheld 106 to designate when image frames 124 are to be captured and when such frame capture is to be stopped is arbitrary and a function of the particular architecture of handheld 106.

At block 308, handheld 106 communicates image frames 124 to remote control module 118. Remote control module 118 is implemented on a different computing device (e.g., general-purpose computer 102). At block 310, and responsive to receipt of image frames 124, remote control module 118 compares consecutive image frames 124 to identify cursor position using cues such as color, shape, motion or a combinations of them. A history of relative presentation 114 and image 124 positions is used to recover a transformation from image 124 and presentation 114 coordinate systems. In another implementation, cursor identification is implemented on board handheld 106, and only the cursor position in the captured frames 124, and not the-captured frames 124 themselves, is communicated to the remote control module 118.

At block 312, remote control module 118 modifies position of cursor 120 over presentation 114 as a function of the estimated transformation between the images 124 and the slides 114. At block 312, and responsive to user activation of the cursor control over a UI element (selection of the UI element) associated with display of presentation 114, presentation module 110 implements at least one action associated with the selection of the UI element to control presentation 114.

In one implementation, the user selects a UI element associated with presentation 114 by placing a hotspot of cursor control 120 over the UI element and pressing a button on handheld 106. The hotspot location is configurable and may be associated with any respective portion of cursor 120. Additionally, the button used to select an underlying user interface control may be the same button used to activate image capture module 122 to capture image frames 124, or a different button, or other component of handheld. In view of the above, the particular technique implemented by handheld 106 to allow a user to select a UI element associated with presentation 114 with cursor 120 is arbitrary, being a function of the particular architecture of handheld 106.

An Exemplary Operating Environment

Figure 4:
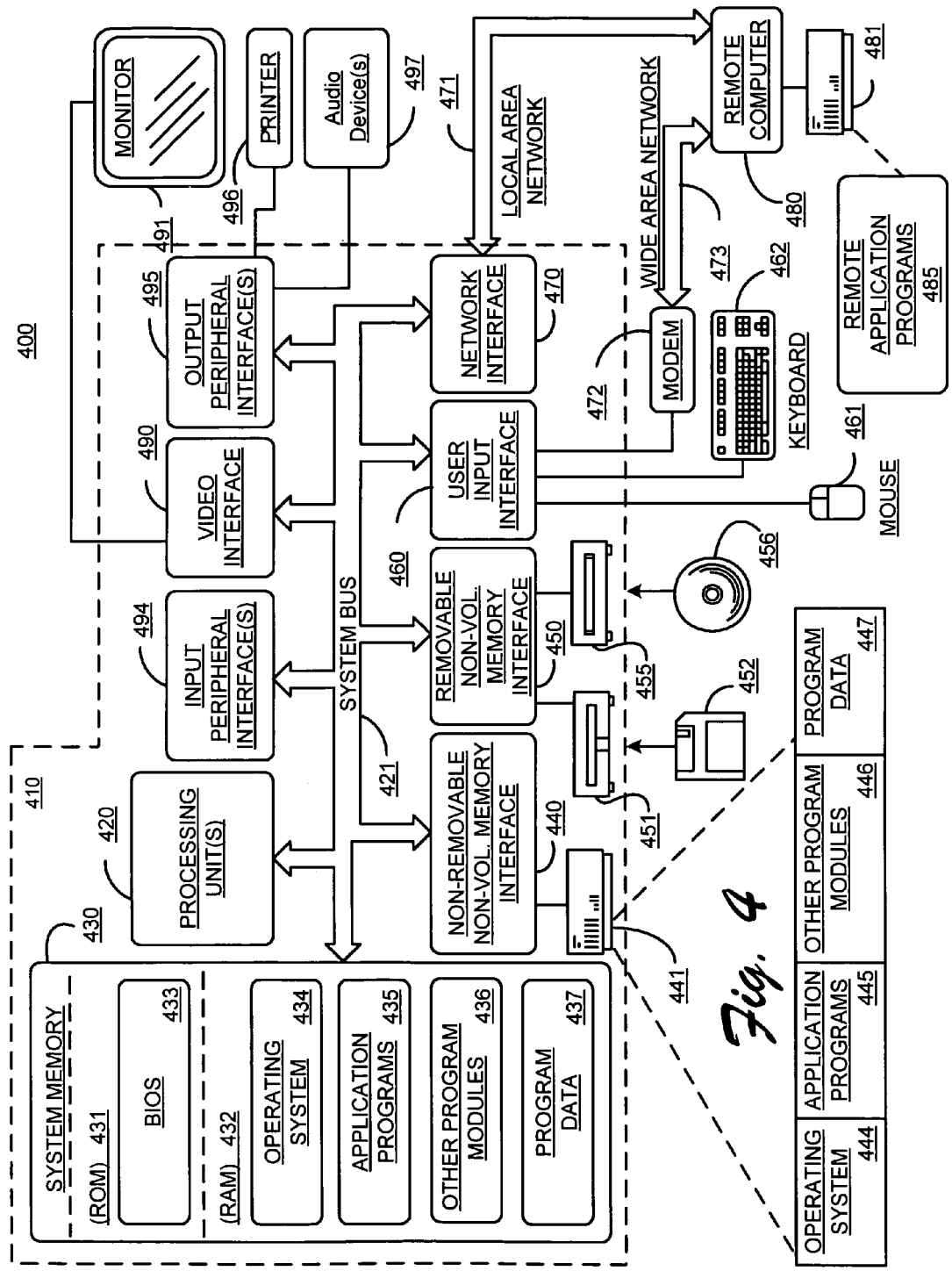
FIG. 4 shows an example of a suitable computing environment in which systems and methods for remote control of on-screen interactions may be fully or partially implemented.

FIG. 4 illustrates an example of a suitable computing environment 400 in which the systems and methods for remote control of on-screen interactions may be fully or partially implemented. Exemplary computing environment 400 is only one example of a suitable computing environment for the exemplary system of FIG. 1 and exemplary operations of FIG. 3, and is not intended to suggest any limitation as to the scope of use or functionality of systems and methods described herein. Neither should computing environment 400 be interpreted as having any dependency or requirement relating to any one or combination of components illustrated in computing environment 400.

The methods and systems described herein are operational with numerous other general purpose or special purpose computing system, environments or configurations. Examples of well-known computing systems, environments, and/or configurations that may be suitable for use include, but are not limited to, personal computers, laptops, small form factor mobile computing device (e.g., a cellular phone, personal digital assistant, or handheld computer), server computers, multiprocessor systems, microprocessor-based systems, network PCs, minicomputers, mainframe computers, distributed computing environments that include any of the above systems or devices, and so on. The invention is practiced in a distributed computing environment where tasks are performed by remote processing devices that are linked through a communications network. In a distributed computing environment, program modules may be located in both local and remote memory storage devices.

With reference to FIG. 4, an exemplary system 400 illustrates an example of a suitable computing environment in which systems and methods for remote control of on-screen interactions may be fully or partially implemented. System 400 includes a general purpose computing device in the form of a computer 410 implementing, for example, computing device 102 of FIG. 1. Components of computer 410 may include, but are not limited to, processing unit(s) 420, a system memory 430, and a system bus 421 that couples various system components including the system memory to the processing unit 420. The system bus 421 may be any of several types of bus structures including a memory bus or memory controller, a peripheral bus, and a local bus using any of a variety of bus architectures. By way of example and not limitation, such architectures may include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

A computer 410 typically includes a variety of computer-readable media. Computer-readable media can be any available media that can be accessed by computer 410 and includes both volatile and nonvolatile media, removable and non-removable media. By way of example, and not limitation, computer-readable media may comprise computer storage media and communication media. Computer storage media includes volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 410.

Communication media typically embodies computer-readable instructions, data structures, program modules or other data in a modulated data signal such as a carrier wave or other transport mechanism, and includes any information delivery media. The term "modulated data signal" means a signal that has one or more of its characteristics set or changed in such a manner as to encode information in the signal. By way of example and not limitation, communication media includes wired media such as a wired network or a direct-wired connection, and wireless media such as acoustic, RF, infrared and other wireless media. Combinations of the any of the above should also be included within the scope of computer-readable media.

System memory 430 includes computer storage media in the form of volatile and/or nonvolatile memory such as read only memory (ROM) 431 and random access memory (RAM) 432. A basic input/output system 433 (BIOS), containing the basic routines that help to transfer information between elements within computer 410, such as during start-up, is typically stored in ROM 431. RAM 432 typically contains data and/or program modules that are immediately accessible to and/or presently being operated on by processing unit 420. By way of example and not limitation, FIG. 4 illustrates operating system 434, application programs 435, other program modules 436, and program data 437.

The computer 410 may also include other removable/non-removable volatile/nonvolatile computer storage media. By way of example only, FIG. 4 illustrates a hard disk drive 441 that reads from or writes to non-removable, nonvolatile magnetic media, a magnetic disk drive 451 that reads from or writes to a removable, nonvolatile magnetic disk 452, and an optical disk drive 455 that reads from or writes to a removable, nonvolatile optical disk 456 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 441 is typically connected to the system bus 421 through a non-removable memory interface such as interface 440, and magnetic disk drive 451 and optical disk drive 455 are typically connected to the system bus 421 by a removable memory interface, such as interface 450.

The drives and their associated computer storage media discussed above and illustrated in FIG. 4, provide storage of computer-readable instructions, data structures, program modules and other data for the computer 410. In FIG. 4, for example, hard disk drive 441 is illustrated as storing operating system 444, application programs 445, other program modules 446, and program data 447. Note that these components can either be the same as or different from operating system 434, application programs 435, other program modules 436, and program data 437. Operating system 444, application programs 445, other program modules 446, and program data 447 are given different numbers here to illustrate that they are at least different copies.

A user may enter commands and information into the computer 410 through input devices such as a keyboard 462 and pointing device 461, commonly referred to as a mouse, trackball or touch pad. Other input devices (not shown) may include a microphone, joystick, game pad, satellite dish, scanner, or the like. These and other input devices are often connected to the processing unit 420 through a user input interface 460 that is coupled to the system bus 421, but may be connected by other interface and bus structures, such as a parallel port, game port or a universal serial bus (USB).

In one implementation, a monitor 491 or other type of display device is also connected to the system bus 421 via an interface, such as a video interface 490. In addition to the monitor, computers may also include other peripheral output devices such as printer 496 and audio devices 497, which may be connected through an output peripheral interface 495.

The computer 410 operates in a networked environment using logical connections to one or more remote computers, such as a remote computer 480. The remote computer 480 is a handheld computing device such as handheld 106 of FIG. 1.

The logical connections depicted in FIG. 4 include a local area network (LAN) 471 and a wide area network (WAN) 473, but may also include other networks. Such networking environments are commonplace in offices, enterprise-wide computer networks, intranets and the Internet.

When used in a LAN networking environment, the computer 410 is connected to the LAN 471 through a network interface or adapter 470. When used in a WAN networking environment, the computer 410 typically includes a modem 472 or other means for establishing communications over the WAN 473, such as the Internet. The modem 472, which may be internal or external, may be connected to the system bus 421 via the user input interface 460, or other appropriate mechanism. In a networked environment, program modules depicted relative to the computer 410, or portions thereof, may be stored in the remote memory storage device. By way of example and not limitation, FIG. 4 illustrates remote application programs 485 as residing on memory device 481. The network connections shown are exemplary and other means of establishing a communications link between the computers may be used.

CONCLUSION

Although the systems and methods for remote control of on-screen interactions have been described in language specific to structural features and/or methodological operations or actions, it is understood that the implementations defined in the appended claims are not necessarily limited to the specific features or actions described. For example, system 100 of FIG. 1 is described as using projector 108 to display presentation 114 onto display surface 116. However, in another implementation, presentation module 110 directly displays presentation 114 onto a display surface 116, and projector 108 is not used. In this latter implementation, the display surface 116 is an LCD, a CRT, electronic billboard and/or the like. In another implementation, handheld global motion module 130 of FIG. 1, and interest areas 128, are implemented on handheld 106. In this alternate implementation, handheld 106 determines and communicates a cursor position in a frame 124 to remote control module 118. In this latter implementation, handheld 106 does not communicate image frames 124 to computing device 102. Accordingly, the specific features and operations are disclosed as exemplary forms of implementing the claimed subject matter.

The invention claimed is:

1. A method, comprising:
    displaying a selection control to interface with one or more user interface (UI) elements to operate a presentation;
    receiving, from a remote handheld device, a set of image frames representing respective snapshots of the selection control;
    identifying an initial location of the selection control based on the image frames;
    identifying a target location of the selection control after displaying the selection control; and
    moving the selection control to the target location.

2. A method as recited in claim 1, wherein
    the receiving, from a remote handheld device, a set of image frames includes receiving information characteristic of the initial location of the selection control into a computing device for processing.

3. A method as recited in claim 1, wherein the presentation is a slideshow presentation.

4. A method as recited in claim 1, wherein the selection control is a cursor control.

5. A method as recited in claim 1, wherein the identifying a target location of the selection control comprises
    calculating a projective homography indicating a transformation between a sensor coupled to the remote handheld device and a coordinate system associated with the presentation without identifying special points in the presentation.

6. A method as recited in claim 1, wherein the identifying a target location of the selection control comprises:
    determining a center of a first image frame;
    determining a center of a second image frame, the second image frame subsequent in time to the first image frame; and
    calculating an offset distance from the center of the first image frame to the center of the second image frame.

7. A method as recited in claim 1, further comprising:
    controlling the presentation via an action associated with an element of the one or more UI elements when:
        the selection control is moved to a target location that contains the element; and
        the element is selected via the selection control.

8. A computer-readable medium storing computer-program instructions executable by a processor for:
    displaying a selection control to interface with one or more user interface (UI) elements to operate a presentation;
    receiving, from a remote handheld device, a set of image frames representing respective snapshots of the selection control;
    identifying an initial location of the selection control based on the image frames; and
    identifying a target location of the selection control based on the image frames representing snapshots of the selection control.

9. A computer-readable medium as recited in claim 8, further comprising processor-executable instructions for:
    determining a transformation between a sensor coupled to the handheld device and a displayed image of the presentation; and
    moving the selection control to the target location as a function of the transformation.

10. A computer-readable medium as recited in claim 8, wherein the presentation is a slideshow presentation.

11. A computer-readable medium as recited in claim 8, wherein the selection control is a cursor control.

12. A computer-readable medium as recited in claim 8, wherein the computer-program instructions for identifying a target location of the selection control comprise instructions for:
    calculating a projective homography indicating a transformation between a sensor coupled to the remote handheld device and a coordinate system associated with the presentation.

13. A computer-readable medium as recited in claim 12, wherein the transformation is a function of a user panning the remote handheld device.

14. A computer-readable medium as recited in claim 12, wherein the computer-program instructions further comprise instructions for:
    controlling the presentation via an action associated with an element of the one or more UI elements when:
        the selection control is moved to a target location that contains the element; and
        the element is selected via the selection control.

15. A computer-readable medium having instructions stored thereon for execution by a processor to control a presentation displayed onto a display surface comprising:

displaying a presentation onto a display surface, the presentation comprising a selection control to interface with one or more user interface (UI) elements to operate the presentation;

receiving, from a remote handheld device, a set of image frames representing respective snapshots of the presentation identifying an initial location of the selection control based on the image frames; and identifying a target location of the selection control after displaying the selection control.

16. A computer-readable medium as recited in claim 15, wherein the instructions to control a presentation displayed onto a display surface further comprise instructions for:

determining a transformation between a sensor coupled to the handheld device and a displayed image of the presentation; and moving the selection control to the target location as a function of the transformation.

17. A computer-readable medium as recited in claim 15, wherein identifying a target location of the selection control over the presentation comprises:

calculating a projective homography indicating a transformation between a sensor coupled to the remote handheld device and a coordinate system associated with the presentation.

18. A computer-readable medium as recited in claim 17, wherein the instructions to control a presentation displayed onto a display surface further comprise instructions for:

controlling the presentation via an action associated with an element of the one or more UI elements when:

the selection control is moved to a target location that contains the element; and the element is selected via the selection control.

* * * * *